2,984,669
N-METHYL-BENZOXAZOLONE ESTERS OF THIOPHOSPHORIC AND DITHIOPHOSPHORIC ACIDS

Berthold Brähler and Johannes Reese, Wiesbaden-Biebrich, and Rolf Zimmermann, Wiesbaden, Germany, assignors to Chemische Werke Albert, Wiesbaden-Biebrich, Germany, a corporation of Germany No Drawing. Filed Dec. 8, 1959, Ser. No. 858,062
Claims priority, application Germany Dec. 30, 1958
6 Claims. (Cl. 260—307)

This invention relates to 3-N-methyl-benzoxazole-2-one esters of thiophosphoric acid and dithiophosphoric acid and methods of preparing the same.

More particularly, the present invention relates to compounds having the general structural formula

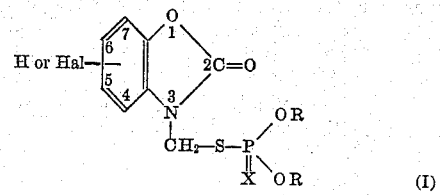

wherein R is a lower alkyl radical, preferably with 1 to 4 carbon atoms, X is oxygen or sulfur and Hal is a halogen.

The compounds according to the present invention may be prepared by reacting N-halomethyl-benzoxazolones of the formula

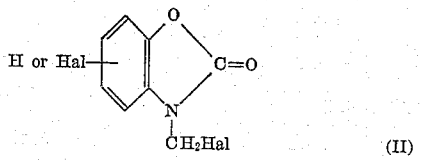

wherein Hal is a halogen, with a salt of an O,O-dialkyl-thiophosphoric acid or an O,O-dialkyl-dithiophosphoric acid of the formula

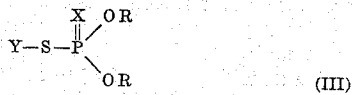

wherein Y is an alkali metal or an ammonium ion ($NH_4^+$—) and R and X have the meanings previously defined in connection with Formula I.

The reaction between Compound II and Compound III may be represented by the following reaction formula:

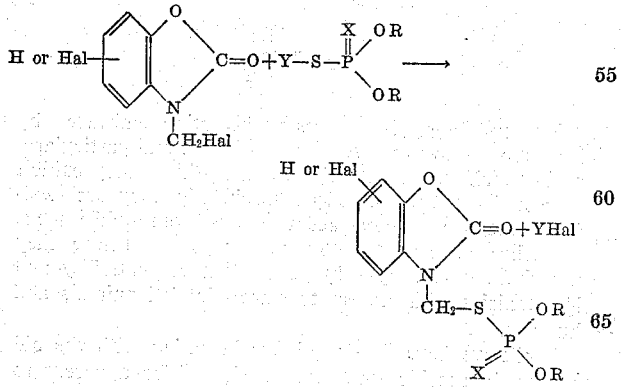

While this reaction will generally proceed at room temperature, it is in some instances preferred to heat the reaction mixture to a temperature between 50 and 70° C. in order to accelerate the rate of reaction and cause it to go to completion. The reaction may further be carried out in the presence of a suitable inert organic solvent medium, for example in acetone or a higher ketone, such as methyl isobutyl ketone, or in aqueous acetone; however, alcohols, dioxan, tetrahydrofuran, benzene, toluene or carbon tetrachloride are also suitable for use as solvents for the reaction. In short, any inert solvent which will not interfere with the reaction itself or decompose the reactants or principal reaction product may be used as the solvent medium.

In place of the salts of O,O-dialkyl-thiophosphoric acid or O,O-dialkyl-dithiophosphoric acid, the free acids may also be used in the reaction, in which case it proceeds in accordance with the following equation:

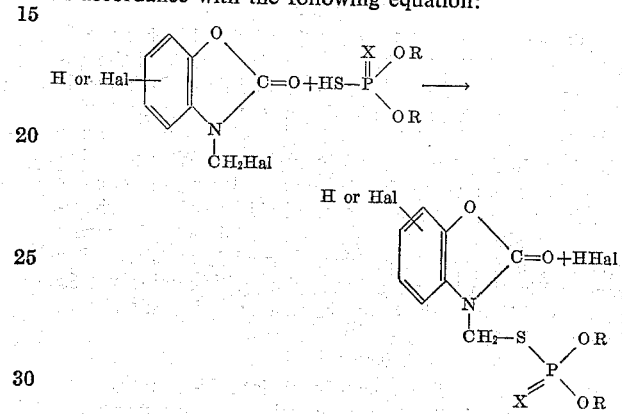

However, under these circumstances it is necessary to add to the reaction mixture an alkaline compound which is capable of neutralizing and tying up the hydrogen halide formed by the reaction. Examples of suitable such alkaline compounds are tertiary amines and pyridine.

The N-halomethyl-benzoxazolones II used as starting materials in the process of producing Compounds III according to the present invention may readily be prepared by well-known procedures, for example from benzoxazolone through the corresponding intermediate N-hydroxymethyl-benzoxazolone compound. If the phenylene ring is to be halo-substituted, the halogen may readily be introduced as a ring substituent by customary methods, such as by direct halogenation with an elemental halogen.

The following examples will further illustrate the present invention and enable others skilled in the art to understand it more completely. It will be understood, however, that the invention is not limited to the particular examples given below.

Example 1

A solution of 5.35 parts by weight N-chloromethyl benzoxazolone in 75 parts by weight dioxan was combined at room temperature with a solution of 5.24 parts by weight S-sodium O,O-dimethyl-dithiophosphate in 10 parts by weight dioxan. After the precipitation of the sodium chloride formed by the reaction had gone to completion the mixture was filtered and the solvent was driven off in vacuo from the filtrate. The crystalline residue was recrystallized from a mixture of benzene and ligroin, whereupon it melted at 68 to 72° C. The product had the structural formula

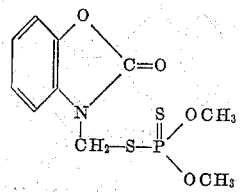

The yield was 7.5 parts by weight (84% of theory).

Example 2

1.58 parts by weight dithiophosphoric acid O,O-dimethyl ester were neutralized with an aqueous solution of sodium bicarbonate and the resulting solution of S-sodium-O,O-dimethyl-dithiophosphate was introduced at room temperature, accompanied by vigorous stirring, into a solution of 1.83 parts by weight of N-chloromethyl-benzoxazolone in 45 parts by weight methyl isobutyl ketone. After allowing the mixture to stand for 1 hour, it separated into an aqueous and an organic phase. The organic phase was separated, dried with sodium sulfate and the solvent was distilled off in vacuo. The crystalline residue was washed with a small amount of methanol and dried, whereupon it had a melting point of 63 to 68° C. The product had the structural formula shown in Example 1. The yield was 1.8 parts by weight (59% of theory).

Example 3

1.58 parts by weight O,O-dimethyl-dithiophosphoric acid are neutralized with aqueous ammonia and the resulting aqueous solution of S-ammonium-O,O-dimethyl-dithiophosphate was combined at room temperature with 1.83 parts by weight N-chloromethyl-benzoxazolone dissolved in 32 parts by weight acetone. After allowing the mixture to stand for 20 hours, the resulting clear solution was concentrated to one half its volume, whereupon a white crystalline mass separated out. The raw reaction product had a melting point of 58 to 65°. After recrystallization from methanol, the melting point was 68 to 73° C. The product had the structural formula shown in Example 1.

Example 4

A solution of 5.49 parts by weight N-chloromethyl-benzoxazolone in 112 parts by weight acetone was combined at room temperature with a solution of 6.24 parts by weight S-sodium-O,O-diethyl-dithiophosphate in 24 parts by weight acetone. After allowing the mixture to stand for 3 hours, the sodium chloride which separated out was filtered off and the solvent was driven off in vacuo from the filtrate. The residue was a slightly yellow oil which gradually solidified in crystalline form. The crystals had a melting point of 120 to 128° C. The product had the structural formula

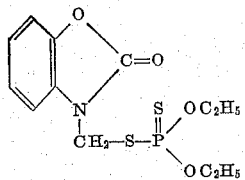

The yield was 8.8 parts by weight (88.1% of theory).

Example 5

A solution of 2.18 parts by weight N-chloromethyl-6-chloro-benzoxazolone in 25 parts by weight of dioxan was added at room temperature to a solution of 1.8 parts by weight S-sodium-O,O-dimethyl-dithiophosphate in 15 parts dioxan. After allowing the mixture to stand for 1 day, the sodium chloride which separated out was filtered off and the filtrate was evaporated in vacuo. A yellow oil remained behind which solidified in crystalline form upon cooling. After recrystallization from a mixture of benzene and petroleum ether the white crystalline product had a melting point of 55 to 57° C. The product had the structural formula

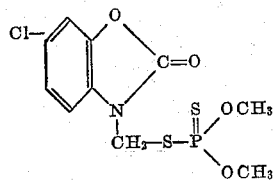

The yield was 2.8 parts by weight (85.5% of theory).

Example 6

2.18 parts by weight N-chloromethyl-6-chloro-benzoxazolone were dissolved in 160 parts by weight carbon tetrachloride by applying a small amount of heat, and the resulting solution was added to an aqueous solution of 1.58 parts by weight S-sodium-O,O-dimethyl-dithiophosphate at about 35° C., accompanied by vigorous stirring. After allowing the resulting mixture to stand for 5 hours at room temperature it divided into an aqueous and an organic phase, the organic phase was separated, dried with sodium sulfate and the solvent was driven off in vacuo. White crystals were obtained which melted at 57 to 59° C. after recrystallization from a mixture of benzene and petroleum ether. The product had the structural formula shown in Example 5. The yield was 2 parts by weight (58.8% of theory).

Example 7

A solution of 1.3 parts by weight N-chloromethyl-6-bromobenzoxazolone in 10 parts by weight dioxan was admixed with a solution of 0.9 part by weight S-sodium-O,O-dimethyl-dithiophosphate in 10 parts by weight dioxan, and the resulting mixture was allowed to stand for three days at room temperature. The sodium chloride formed by the reaction was filtered off and the solvent was evaporated from the filtrate, yielding a yellow oil which rapidly solidified in crystalline form. The crystals had a melting point of 87 to 90° C. The product had the structural formula

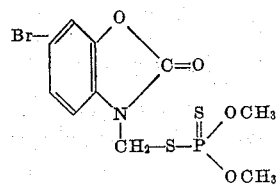

Example 8

A solution of 5.49 parts by weight N-chloromethyl-benzoxazolone in 96 parts by weight acetone was combined with 5.40 parts by weight potassium-O,O-dimethyl-thiophosphate. After allowing the resulting mixture to stand at room temperature for 8 hours it was heated for a few hours at 60° C. to bring the reaction to completion. The potassium chloride formed by the reaction was filtered off and the solvent was evaporated from the filtrate, yielding a yellowish oil which crystallized upon cooling. Recrystallization from methanol yielded white crystals having a melting point of 52 to 55° C. The yield was 6.7 parts by weight (77.3% of theory). The product had the structural formula

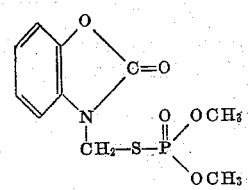

The products of the present invention embraced by Formula I above are useful as pesticides, and particularly as insecticides and acaricides. In addition, they exhibit fungistatic properties. More specifically, they are especially effective as lethal agents against household insects, plant lice, corn borers, cotton pests. Furthermore, they are characterized by very good plant compatibility and low toxicity with respect to warm-blooded animals and humans.

While we have illustrated our invention with the aid of certain specific embodiments, it will be apparent to those skilled in the art that the invention is not limited to these particular embodiments and that various changes and modifications can be made without departing from the spirit of the invention or the scope of the appended claims.

We claim:

1. Esters of O,O-dialkyl-thiophosphoric and O,O-dialkyl-dithiophosphoric acids having a formula selected from the group consisting of

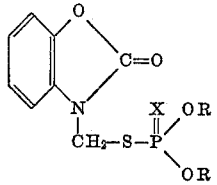

and

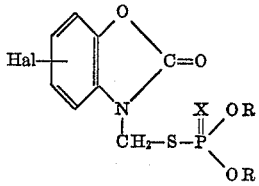

wherein R is a lower alkyl radical, X is selected from the group consisting of oxygen and sulfur, and Hal is a halogen.

2. The ester of O,O-dimethyl-dithiophosphoric acid having the formula

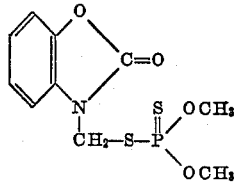

3. The ester of O,O-diethyl-dithiophosphoric acid having the formula

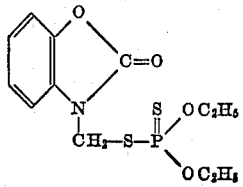

4. The ester of O,O-dimethyl-dithiophosphoric acid having the formula

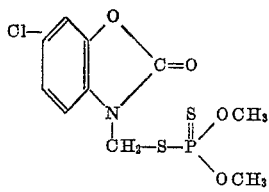

5. The ester of O,O-dimethyl-dithiophosphoric acid having the formula

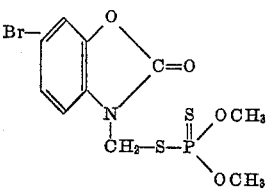

6. The ester of O,O-dimethyl-thiophosphoric acid having the formula

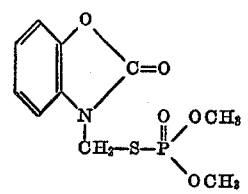

References Cited in the file of this patent

UNITED STATES PATENTS

| | | |
|---|---|---|
| 2,877,155 | Metivier | Mar. 10, 1959 |
| 2,922,794 | Model et al. | Jan. 26, 1960 |

FOREIGN PATENTS

| | | |
|---|---|---|
| 713,278 | Great Britain | Aug. 11, 1954 |

OTHER REFERENCES

Frear et al.: J. of Economic Entomology, vol. 40, pp. 736–741 (1947).